United States Patent
Sasaki et al.

(10) Patent No.: US 8,558,527 B2
(45) Date of Patent: *Oct. 15, 2013

(54) SWITCHING POWER SUPPLY SYSTEM PROVIDED WITH UNDER VOLTAGE LOCK OUT CIRCUIT

(75) Inventors: Masahiro Sasaki, Matsumoto (JP); Tetsuya Kawashima, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 212 days.

This patent is subject to a terminal disclaimer.

(21) Appl. No.: 13/109,331

(22) Filed: May 17, 2011

(65) Prior Publication Data

US 2011/0279101 A1    Nov. 17, 2011

(30) Foreign Application Priority Data

May 17, 2010  (JP) ................................. 2010-112831
Nov. 16, 2010 (JP) ................................. 2010-255763

(51) Int. Cl.
  *G05F 1/00* (2006.01)
(52) U.S. Cl.
  USPC ........................................................ 323/283
(58) Field of Classification Search
  USPC ................................................. 323/282–285
  See application file for complete search history.

(56) References Cited

U.S. PATENT DOCUMENTS

| | | | | |
|---|---|---|---|---|
| 5,424,897 | A * | 6/1995 | Mietus et al. | 361/92 |
| 7,099,164 | B2 * | 8/2006 | Zhu et al. | 363/21.12 |
| 2002/0125942 | A1 * | 9/2002 | Dunnebacke et al. | 330/69 |
| 2006/0171175 | A1 * | 8/2006 | Zhu et al. | 363/21.12 |
| 2006/0291258 | A1 * | 12/2006 | Zhu et al. | 363/21.12 |
| 2007/0263419 | A1 | 11/2007 | Sasaki et al. | |
| 2008/0278973 | A1 * | 11/2008 | Lin et al. | 363/21.08 |
| 2009/0108827 | A1 * | 4/2009 | Sasaki et al. | 323/299 |
| 2009/0303641 | A1 | 12/2009 | Abe | |
| 2010/0090673 | A1 * | 4/2010 | Nakagawa et al. | 323/284 |
| 2010/0141320 | A1 * | 6/2010 | Lin et al. | 327/198 |

FOREIGN PATENT DOCUMENTS

| | | | |
|---|---|---|---|
| JP | 2006-115594 | A | 4/2006 |
| JP | 2007-306648 | A | 11/2007 |
| JP | 2008-306788 | A | 12/2008 |

* cited by examiner

*Primary Examiner* — Jue Zhang

(74) *Attorney, Agent, or Firm* — Rossi, Kimms & McDowell LLP

(57) ABSTRACT

A switching power supply system controlling switching operations of switching devices by a control circuit to convert an input voltage into a desired output voltage, the system being provided with a under voltage lock out circuit including: an input voltage detection unit detecting an input voltage and producing an input voltage digital signal corresponding to the input voltage Vin; and a voltage level comparison unit carrying out digital comparison of the input voltage digital signal with each of two voltage detection level data and outputting the results of the comparisons as an output signal, in which by changing voltage detection level data stored in two registers, desired voltage detection levels and hysteresis characteristic are easily actualized.

7 Claims, 11 Drawing Sheets

SWITCHING POWER SUPPLY SYSTEM PROVIDED WITH UNDER VOLTAGE LOCK OUT CIRCUIT

BACKGROUND OF THE INVENTION

1. Field of the Invention

The present invention relates to a switching power supply system that converts an input voltage to a desired output voltage by carrying out on-off control of switching devices, particularly to a switching power supply system provided with an under voltage lock out circuit (hereinafter referred to as a UVLO circuit).

2. Background Art

A switching power supply system is a power supply system that carries out an on-off control of an input voltage with switching devices to convert the input voltage to a desired output voltage. In general, a switching power supply system contains a UVLO circuit so as not to perform an abnormal operation when the power supply voltage of the internal circuit in the system is no more than the power supply voltage that enables the operation of the internal circuit. The UVLO circuit has a function of detecting an under voltage state of the power supply voltage by comparing a reference voltage with the power supply voltage of the switching power supply system and, when the internal circuit is in an under voltage state of the power supply voltage, terminating the operation of the switching power supply system. FIG. 10 is a block diagram showing an example of the configuration of a switching power supply system containing a related UVLO circuit.

The switching power supply system shown in FIG. 10 is formed of a UVLO circuit 31, an OR circuit 32, a control circuit 3, an output circuit 4, a smoothing circuit 5 and a load circuit 6. The output circuit 4 includes a pair of switching devices QP and QN. The switching device QP is a P-channel MOSFET (Metal Oxide Semiconductor Field Effect Transistor: hereinafter referred to as a PMOS) and the switching device QN is an N-channel MOSFET (Metal Oxide Semiconductor Field Effect Transistor: hereinafter referred to as an NMOS). The smoothing circuit 5 includes an inductor L and a capacitor C. In FIG. 10, the control circuit 3 controls the on-off operation of the output circuit 4 to convert an input voltage Vin (an input power supply terminal and its voltage are denoted by the same signs) to an output voltage Vout through the smoothing circuit 5 to drive the load circuit 6.

The UVLO circuit 31 compares the input voltage Vin with a reference voltage to produce an output signal UVLOout that permits a switching operation when the input voltage Vin exceeds the reference voltage and inhibits the switching operation when the input voltage Vin becomes equal to or less than the reference voltage. The output signal UVLOout of the UVLO circuit 31, together with an external control signal ENB, controls the permission or the inhibition of the switching operation of the control circuit 3 through the OR circuit 32.

An example of the circuit configuration of a related UVLO circuit 31 is shown in FIG. 11 (see, for example, Japanese Patent Publication No. JP-A-2006-115594). The related UVLO circuit 31 shown in FIG. 11 has a reference voltage supply terminal Vref with a reference voltage Vref, a voltage dividing circuit formed of resistor elements R11, R12 and R13 connected in series between an input power supply terminal Vin with the input voltage Vin and a ground terminal GND at the ground voltage GND (herein after referred to as GND), a comparator 33 comparing a divided voltage outputted from the voltage dividing circuit with the reference voltage Vref and an NMOS switching device QS. The positive input terminal of the comparator 33 is connected to the reference voltage supply terminal Vref. The negative input terminal of the comparator 33 is connected to the connection point between the resistor element R11 and the resistor element R12 in the voltage dividing circuit to have a divided voltage Vfb of the input voltage Vin inputted. The output side of the comparator 33 outputs an output signal UVLOout and, along with this, is connected to the gate of the NMOS switching device QS. The drain of the NMOS switching device QS is connected to the connection point of the resistor elements with the source connected to GND.

In the UVLO circuit 31 shown in FIG. 11, the divided voltage Vfb, to which the input voltage Vin is divided by the resistor elements R11, R12 and R13, is compared with the reference voltage Vref by the comparator 33. When the divided voltage Vfb is equal to or less than the reference voltage Vref, the level of the output signal UVLOout of the comparator 33 becomes a high level (hereinafter referred to as Hi level) that inhibits a switching operation. While, when the divided voltage Vfb exceeds the reference voltage Vref, the level of the output signal UVLOout of the comparator 33 becomes a low level (hereinafter referred to as Lo level) that permits a switching operation. That is, the threshold voltage (the voltage at which the level of the output signal is switched between the Hi level and the Lo level) is the reference voltage Vref.

The turning-on and -off of the NMOS switching device QS is controlled by the output signal UVLOout of the comparator 33 to switch the states of the resistor element R13 between short circuit and conduction. With the voltage level of the divided voltage Vfb when increasing the input voltage Vin is made differed from the voltage level of the divided voltage Vfb when decreasing the input voltage Vin, a hysteresis characteristic is brought into actualization in the output of the comparator 33. The hysteresis characteristic prevents the switching power supply system from unstable operations at a transition such as turning on the power. Namely, an increase in the input voltage Vin makes the divided voltage Vfb exceed the reference voltage Vref to switch the level of the output signal UCLOout from the Hi level that inhibits a switching operation to the Lo level that permits a switching operation to thereby start a switching operation. However, the switching operation causes a current flowing in the switching power supply system to increase, which decreases input voltage Vin to cause the divided voltage Vfb to come to be below the reference voltage Vref. Then, when no hysteresis characteristic is provided, the level of the output signal UVLOout is switched from the Lo level to the Hi level again to result in the stop of the switching operation. A hysteresis characteristic is to prevent such an unstable operation.

As was explained in the foregoing, the related UVLO circuit 31 shown in FIG. 11 compares the divided voltage Vfb, which is provided by dividing the input voltage Vin by the resistors connected in series, with the reference voltage Vref by the comparator 33 to produce the output signal UVLOout, by which permission and inhibition of the switching operation of the switching power supply system are controlled.

In the switching power supply system provided with the related UVLO circuit explained above, there were the following problems.

The switching operation of the switching power supply system is controlled by the result of comparison of the reference voltage Vref and the divided voltage Vfb of the voltage dividing circuit of resistors connected in series in the UVLO circuit. Thus, there is a problem in that when setting the threshold voltage and the hysteresis characteristic of the UVLO circuit to each of the various purposes of the use of the switching power supply system, a plurality of reference voltage supplies and voltage dividing circuits of resistors connected in series must be made contained in the UVLO circuit beforehand for being chosen and used for providing a combination of a reference voltage supply and a voltage dividing circuit to a threshold voltage and a hysteresis characteristic being desired, or a switching power supply system containing a UVLO circuit with a reference voltage and a voltage dividing circuit being desired must be provided for each purpose of the use, which causes very poor flexibility in use.

Moreover, there is a further problem in that variations in manufacturing switching devices and resistor elements affects the threshold voltages and hysteresis characteristics of the UVLO circuits. Furthermore, there is another problem in that a current always flowing between the input power supply terminal Vin and GND through the voltage dividing circuit causes consumed electric power to increase.

Embodiments of the invention were made in view of the above problems with an object to be achieved being to solve the above problems and to provide a switching power supply system which contains a UVLO circuit being actualized so that an input voltage is detected as a digital signal for carrying out a digital comparison with a reference voltage and a hysteresis characteristic set in digital data to thereby make a threshold voltage and a hysteresis characteristic of the UVLO circuit easily changed or adjusted to those desired and which therefore consumes low electric power.

SUMMARY OF THE INVENTION

For achieving the object, the switching power supply system according to certain embodiments is provided with a UVLO circuit including: an input voltage detection unit detecting an input voltage and producing an input voltage digital signal representing the magnitude of the input voltage; and a voltage level comparison unit carrying out digital comparison of the input voltage digital signal with each of first and second voltage detection level data and outputting the results of the comparisons, and carries out control so that the switching operation is inhibited when the magnitude of the input voltage represented by the input voltage digital signal is smaller than the magnitude of the voltage represented by each of the first and second voltage detection level data, and the switching operation is permitted when the magnitude of the input voltage represented by the input voltage digital signal is larger than the magnitude of the voltage represented by each of the first and second voltage detection level data.

The input voltage detection unit includes: a resistor array unit having a variable resistor circuit and a resistor element provided between the input voltage and the ground voltage and outputting a divided voltage of the input voltage; a reference voltage supply outputting a first and second reference voltages; a first comparison circuit comparing the divided voltage of the input voltage with the first reference voltage to output a first comparison signal; a second comparison circuit comparing the divided voltage of the input voltage with the second reference voltage to output a second comparison signal; and an input voltage control circuit carrying out control of the voltage dividing ratio for the divided voltage of the input voltage on the basis of the first and second comparison signals so that the divided voltage of the input voltage is kept between the first and second reference voltages to produce the input voltage digital signal on the basis of the dividing ratio at that time.

The voltage level comparison unit includes: a first register circuit storing the first voltage detection level data; a second register circuit storing the second voltage detection level data; and a digital comparison circuit including: a first comparator carrying out digital comparison of the input voltage digital signal with the first voltage detection level data; a second comparator carrying out digital comparison of the input voltage digital signal with the second voltage detection level data; and a decision circuit carrying out a decision of the voltage level of the input voltage on the basis of the levels of the outputs of the first and second comparators to produce a permission signal or an inhibition signal of the switching operation.

Moreover, the input voltage detection unit further includes a timer circuit to set a detection period of the input voltage. In addition, the resistor array unit has a switching device connected in series thereto, and the switching device has its turning-on and -off controlled at the detection period of the input voltage.

The switching power supply system provided with the UVLO circuit according to the invention actualizes the UVLO circuit as a circuit that detects an input voltage as a digital signal and compares the digital signal with two voltage detection level data respectively stored in two registers by a digital comparison circuit. This enables a threshold voltage and a hysteresis characteristic in the UVLO circuit to be easily changed and adjusted. In addition, by shutting off the current path in the resistor array unit except the time when the UVLO circuit is in an input voltage detection operation, the switching power supply system is also effective in actualizing low power consumption.

DESCRIPTION OF THE PREFERRED EMBODIMENT

In the following, an example of a switching power supply system provided with a UVLO circuit according to an embodiment of the invention will be explained with reference to attached drawings.

Figure 1:
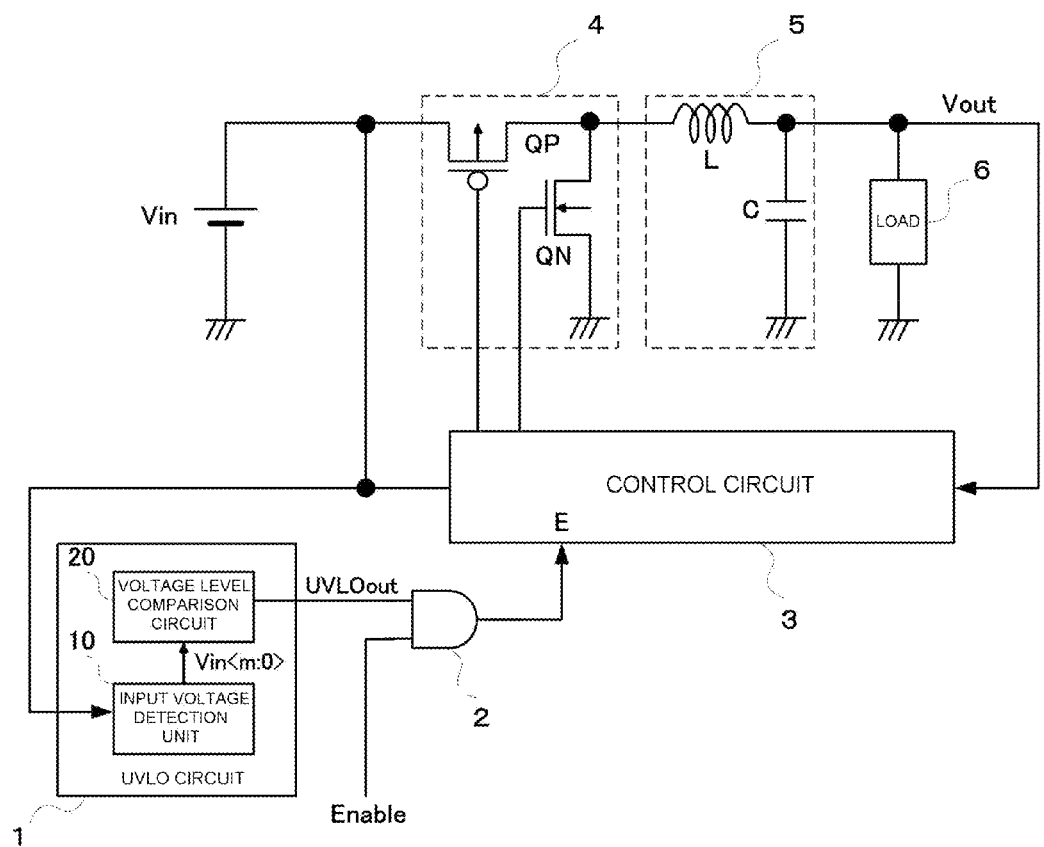
FIG. 1 is a block diagram showing an example of the configuration of a switching power supply system provided with a UVLO circuit according to embodiments of the invention.
Figure 10:
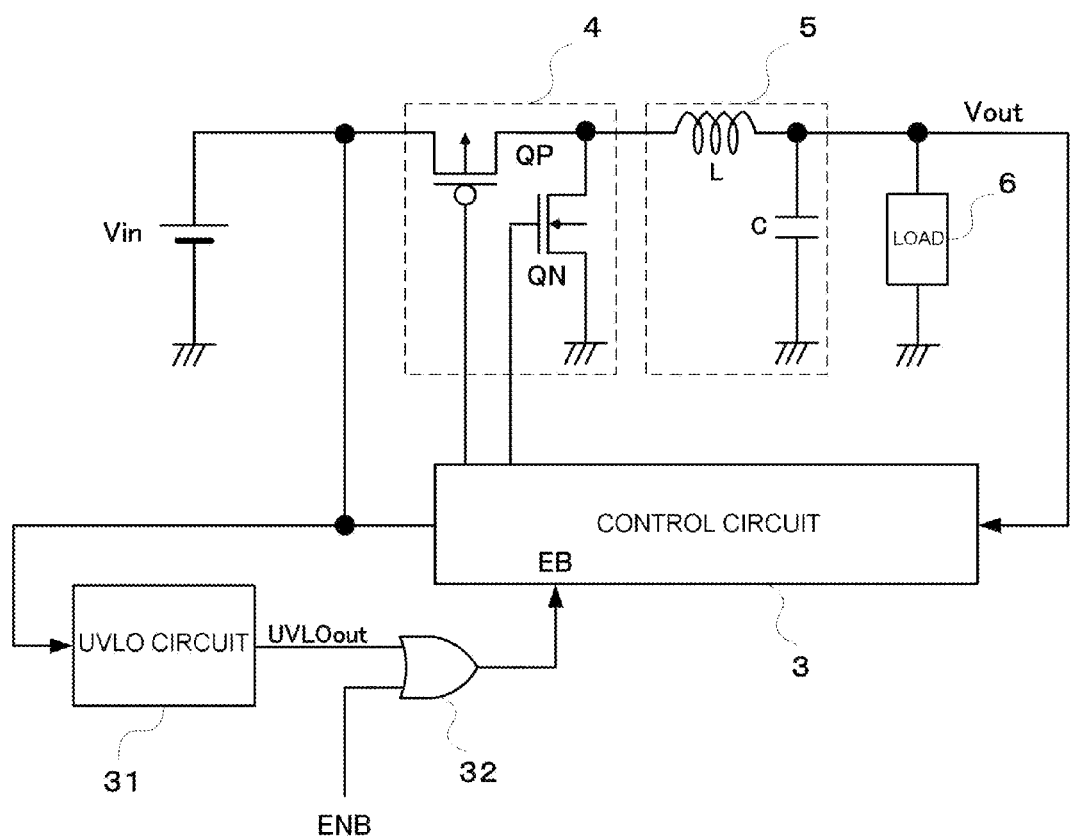
FIG. 10 is a block diagram showing an example of the configuration of a switching power supply system containing a related UVLO circuit.
Figure 11:
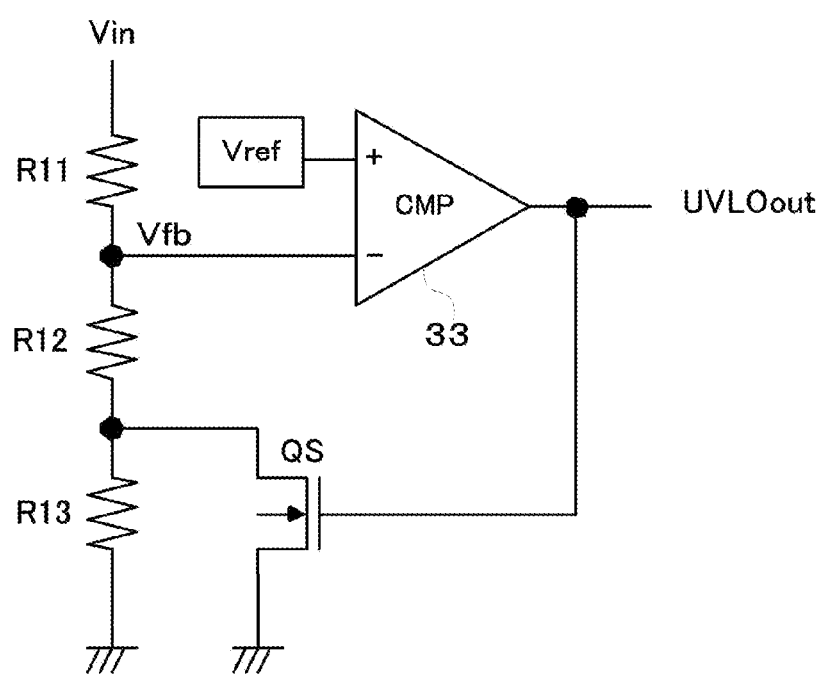
FIG. 11 is a circuit diagram showing an example of the circuit configuration of a related UVLO circuit.

FIG. 1 is a block diagram showing an example of the configuration of a switching power supply system provided with a UVLO circuit according to the invention. The same parts as those in the example of the configuration of the related switching power supply system containing a UVLO circuit shown in FIG. 10 are denoted with the same reference numerals and signs with detailed explanations thereof omitted.

The switching power supply system shown in FIG. 1 is formed of a UVLO circuit 1, an AND circuit 2, a control circuit 3, an output circuit 4, a smoothing circuit 5 and a load circuit 6.

In the configuration shown in FIG. 1, the UVLO circuit 1 is provided with an input voltage detection unit 10 and a voltage level comparison unit 20. The UVLO circuit 1 detects an input voltage Vin by the input voltage detection unit 10 and compares the detected input voltage Vin with a reference voltage in the voltage level comparison unit 20 to output an output signal UVLOout instructing permission or inhibition of the switching operation. The output signal UVLOout is inputted to the AND circuit 2 together with an external control signal Enable to control the switching operation of the control circuit 3 with the output signal of the AND circuit 2. The control circuit 3 carries out control of the on-off operation of the output circuit 4 including a pair of a PMOS switching device QP and an NMOS switching device QN to convert the input voltage Vin to a desired output voltage Vout through the smoothing circuit 5 including an inductor L and a capacitor C to drive the load circuit 6.

Figure 2:
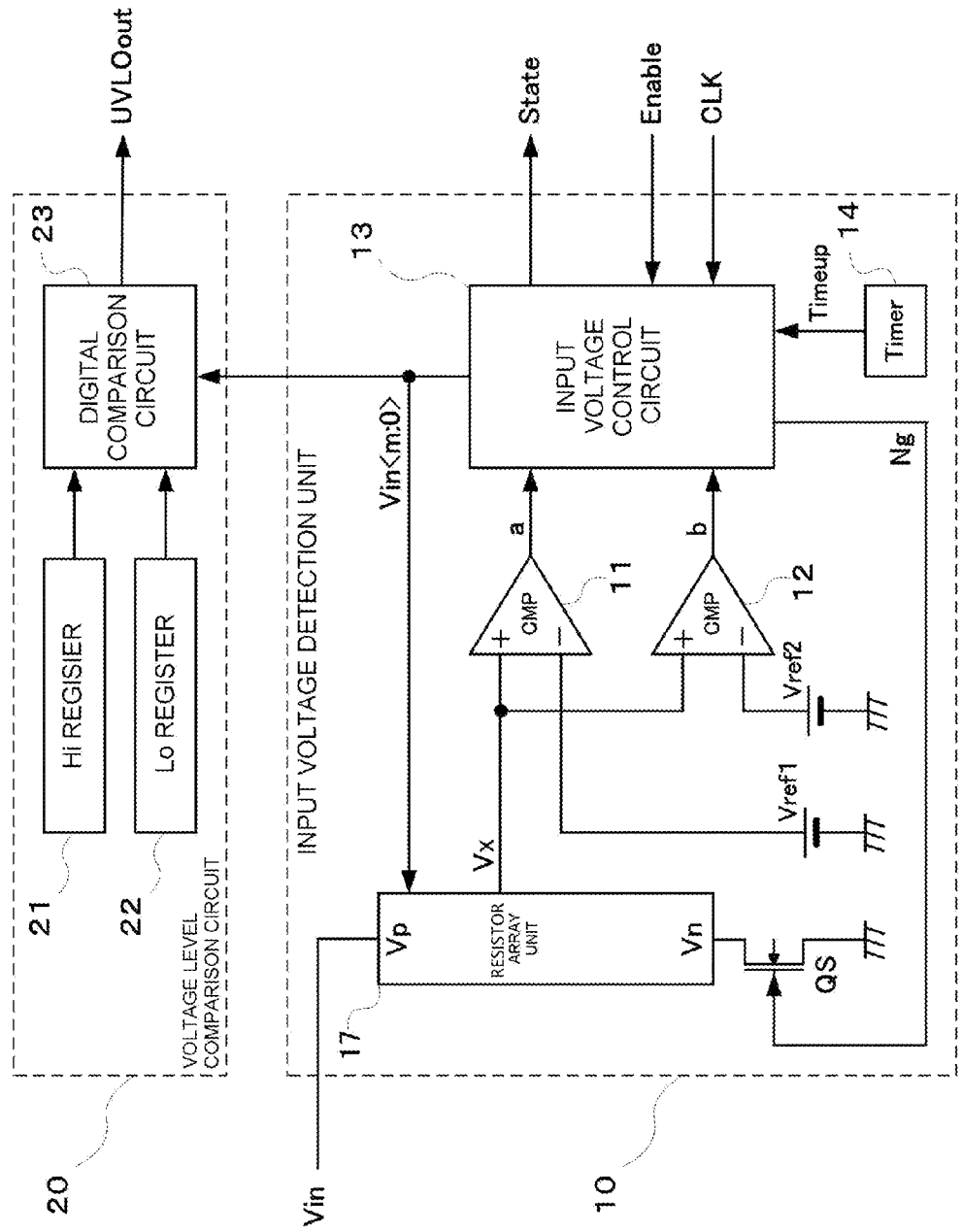
FIG. 2 is a block diagram showing an example of the circuit configuration of the UVLO circuit according to embodiments of the invention.

FIG. 2 is a block diagram showing an example of the circuit configuration of the UVLO circuit 1 according to embodiments of the invention.

In FIG. 2, the input voltage detection unit 10 is provided with a resistor array unit 17 and an NMOS switching device QS which are connected in series between the input power supply terminal Vin and GND, two reference voltage supplies Vref1 and Vref2, two comparators 11 and 12, an input voltage control circuit 13 and a timer circuit 14. Moreover, the voltage level comparison unit 20 is provided with a Hi register 21, a Lo register 22 and a digital comparison circuit 23.

Here, an explanation will be made with respect to the operation of the input voltage detection unit 10 shown in FIG. 2. The input voltage Vin is divided in the resistor array unit 17, from which a divided voltage Vx is outputted. The comparator 11 compares the divided voltage Vx with the reference voltage Vref1 to output a comparison signal "a" and the comparator 12 compares the divided voltage Vx with the reference voltage Vref2 to output a comparison signal "b". The input voltage control circuit 13, on the basis of the comparison signals "a" and "b", outputs a binary input voltage digital signal Vin<m:0> (here, m:0 represents $2^m$ to $2^0$) to control the division of the resistance value of the resistor array unit 17 so that the divided voltage Vx becomes a voltage between the reference voltage Vref1 and the reference voltage Vref2. The binary digital signal at this time is outputted as an input voltage digital signal Vin<m:0>.

Moreover, the timer circuit 14 outputs a periodic signal Timeup controlling the detection operation and the stop of the detection operation of the input voltage Vin and the input voltage control circuit 13 outputs a gate signal Ng controlling on-off of the NMOS switching device QS on the basis of the periodic signal Timeup. At the detection operation of the input voltage Vin, the gate signal Ng is made to be a Hi (high) level signal to make the NMOS switching device QS turned-on to pass a current in the resistor array unit 17, by which a divided voltage Vx is produced. While, at the stop of the detection operation of the input voltage Vin, the gate signal Ng is made to be a Lo (low) level signal to make the NMOS switching device QS turned-off to shut off the current in the resistor array unit 17, by which low electric power consumption is actualized.

Figure 3:
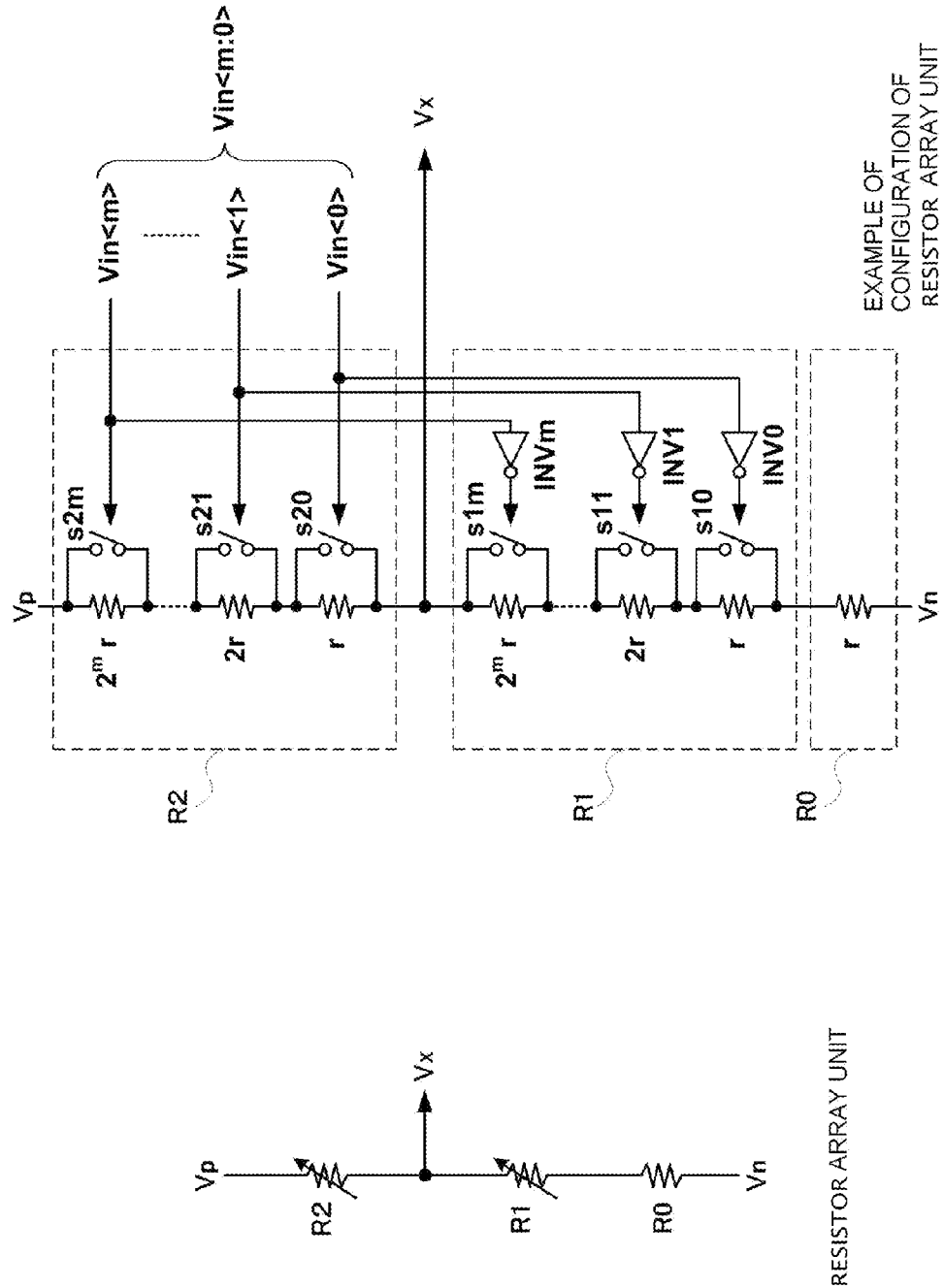
FIGS. 3A and 3B are circuit diagrams each showing an example of the circuit configuration of the resistor array unit forming the input voltage detection unit according to embodiments of the invention.

FIGS. 3A and 3B are circuit diagrams each showing an example of the circuit configuration of the resistor array unit 17 forming the input voltage detection unit 10 according to the invention. The resistor array unit 17 shown in FIG. 3A has a variable resistor circuit R2, a variable resistor circuit R1 and a resistor element R0 connected in series between connecting terminals Vp and Vn with the divided voltage Vx outputted from the connection point of the variable resistor circuit R2 and the variable resistor circuit R1.

In FIG. 3A, the divided voltage Vx outputted from the resistor array unit 17 is expressed by the expression (1) (The on-resistance value of the NMOS switching device QS is assumed to be negligible. Moreover, a resistor and its resistance are denoted by the same signs):

$$Vx = \frac{R0 + R1}{R0 + R1 + R2} Vin \qquad (1)$$

From the expression (1), the input voltage Vin is expressed as the expression (2):

$$Vin = \frac{R0 + R1 + R2}{R0 + R1} Vx \qquad (2)$$

From the expression (2), letting the value of the divided voltage Vx and resistance value R0 be fixed values, the input voltage Vin becomes obtainable by controlling the values of the variable resistors R1 and R2.

In FIG. 3B, there is shown an example of a detailed circuit configuration of the resistor array unit 17. The resistor array unit 17 shown in FIG. 3B is formed with the variable resistor circuit R2, the variable resistor circuit R1 and the resistor element R0 connected in series between the connecting terminals Vp and Vn. Letting the resistance value of the resistor element R0 be r, each of the variable resistor circuit R2 and the variable resistor circuit R1 is formed with a plurality of resistor elements r and 2r to $2^m$r, having resistance values with the resistance value r weighted by numbers of the powers of 2 as r and 2r to $2^m$r, respectively, connected in series each with a switching circuit, a semiconductor switching device such as a PMOS, for example, connected in parallel.

The turning-on and -off of switching circuits s20 to s2m in the variable resistor circuit R2 are controlled by the binary input voltage digital signal Vin<m:0> outputted from the input voltage control circuit 13. While, the turning-on and -off of switching circuits s10 to s1m in the variable resistor circuit R1 are controlled by signals to which the binary input voltage digital signal Vin<m:0> outputted from the input voltage control circuit 13 are inverted in inverters INV0 to INVm, respectively. That is, turning-on and -off of a switching circuit connected in parallel to a resistor element weighted in a certain resistance value in the variable resistor circuit R2 and turning-on and -off of a switching circuit connected in parallel to a resistor element weighted in the same resistance value in the variable resistor circuit R1 are complementarily controlled (when one switching circuit is turned-on, the other is turned-off). The turning-on of a switching circuit causes the resistor element to be in a short-circuited state (The on-resistance value of the semiconductor switching device is assumed to be negligible) and the turning-off of the switching circuit causes the resistor element to provide a weighted resistance value.

Namely, by combining turned-on states and turned-off states of the switching circuits in the variable resistor circuit R2 and the variable resistor circuit R1, the control of the variation in resistance values in the resistor array unit 17 becomes possible.

Figure 4:
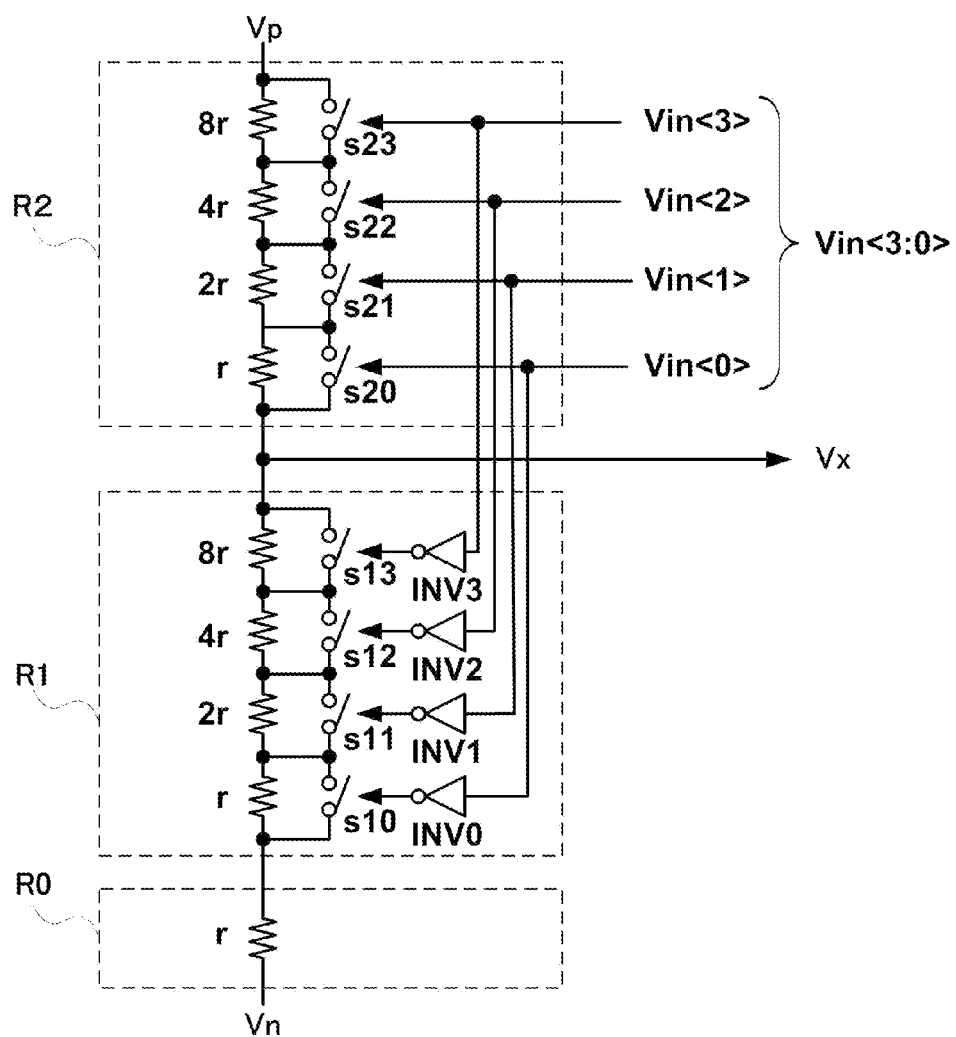
FIG. 4 is a circuit diagram showing an example of the configuration of the resistor array unit forming the input voltage detection unit according to the invention when an input voltage digital signal is a 4 bit digital signal given by four digital signal wires.

Next, by using FIG. 4, the operation principle of the resistor array unit 17 will be explained. FIG. 4 is a circuit diagram showing an example of the configuration of the resistor array unit 17 when an input voltage digital signal Vin<m:0> is a 4 bit input voltage digital signal Vin<3:0> (m=3), which is given by four digital signal wires. When the input voltage digital signal Vin<m:0> is a 4 bit signal, the respective resistance values of the weighted resistor elements forming the variable resistor circuit R2 are 8r (=$2^3$r), 4r (=$2^2$r), 2r (=$2^1$r) and r (=$2^0$r). The respective resistance values of the weighted resistor elements forming the variable resistor circuit R1, like those in the variable resistor circuit R2, also become 8r (=$2^3$r), 4r (=$2^2$r), 2r (=$2^1$r) and r (=$2^0$r). The four digital signal wires of the 4 bit input voltage digital signal Vin<3:0> are connected to their respective switching circuits s23 to s20 in the variable resistor circuit R2 and, through their respective inverters INV3 to INV0, to their respective switching circuits s13 to s10 in the variable resistor circuit R1. Namely, the switching circuits s23, s22, s21 and s20 in the variable resistor circuit R2 are controlled by the input voltage digital signals Vin<3>, Vin<2>, Vin<1>, and Vin<0>, respectively, and the switching circuits s13, s12, s11 and s10 in the variable resistor circuit R1 are controlled by signals to which the input voltage digital signals Vin<3>, Vin<2>, Vin<1>, and Vin<0> are inverted by the inverters INV3, INV2, INV2, INV0, respectively.

Here, with the input voltage digital signal Vin<m:0> being Vin<m:0>=0 (Lo level), let the switching circuits be in turned-on states and, with the input voltage digital signal Vin<m:0> being Vin<m:0>=1 (Hi level), let the switching circuits be in turned-off states.

For example, in the case in which the input voltage digital signal Vin<3:0> is Vin<3:0>=1000, the states of the switching circuits for the weighted resistor elements 8r, 4r, 2r and r in the variable resistor circuit R2 become as s23:off, s22:on, s21:on and s20:on, by which the value of the resistance in the variable resistor circuit R2 becomes 8r. While, the states of the switching circuits for the weighted resistor elements 8r, 4r, 2r and r in the variable resistor circuit R1 become as s13:on, s12:off, s11:off and s10:off, by which the value of the resistance in the variable resistor circuit R2 becomes 7r. Therefore, the divided voltage Vx and the input voltage Vin become as expressed by the expression (3) and the expression (4):

$$Vx = \frac{r+7r}{r+7r+8r}Vin = \frac{8}{16}Vin \quad (3)$$

$$Vin = \frac{16}{8}Vx \quad (4)$$

In the same way, in the case in which Vin<3:0> is Vin<3:0>=1001, the states of the switching circuits for the weighted resistor elements 8r, 4r, 2r and r in the variable resistor circuit R2 become as s23:off, s22:on, s21:on and s20:off, by which the value of the resistance in the variable resistor circuit R2 becomes 9r. While, the states of the switching circuits for the weighted resistor elements 8r, 4r, 2r and r in the variable resistor circuit R1 become as s13:on, s12:off, s11:off and s10:on, by which the value of the variable resistance in the variable resistor circuit R1 becomes 6r. Therefore, the divided voltage Vx and the input voltage Vin become as expressed by the expression (5) and the expression (6):

$$Vx = \frac{r+6r}{r+6r+9r}Vin = \frac{7}{16}Vin \quad (5)$$

$$Vin = \frac{16}{7}Vx \quad (6)$$

As was explained above, with the value of the divided voltage Vx and the resistance value of the resistor element R0 taken as fixed values, by controlling the resistance values of the variable resistor circuit R1 and R2, the input voltage Vin becomes obtainable. Namely, with the value of the divided voltage Vx and the resistance value of the resistor element R0 made fixed, by making the resistance values of the variable resistor circuit R1 and the variable resistor circuit R2 controlled by binary digital signals so that the divided voltage Vx comes to be given as the reference voltage Vref2<the divided voltage Vx<the reference voltage Vref1, and making the digital values of the binary digital signals become the input voltage digital signal Vin<m:0>, it becomes possible to convert the input voltage Vin into the input voltage digital signal Vin<m:0>.

Figure 5:
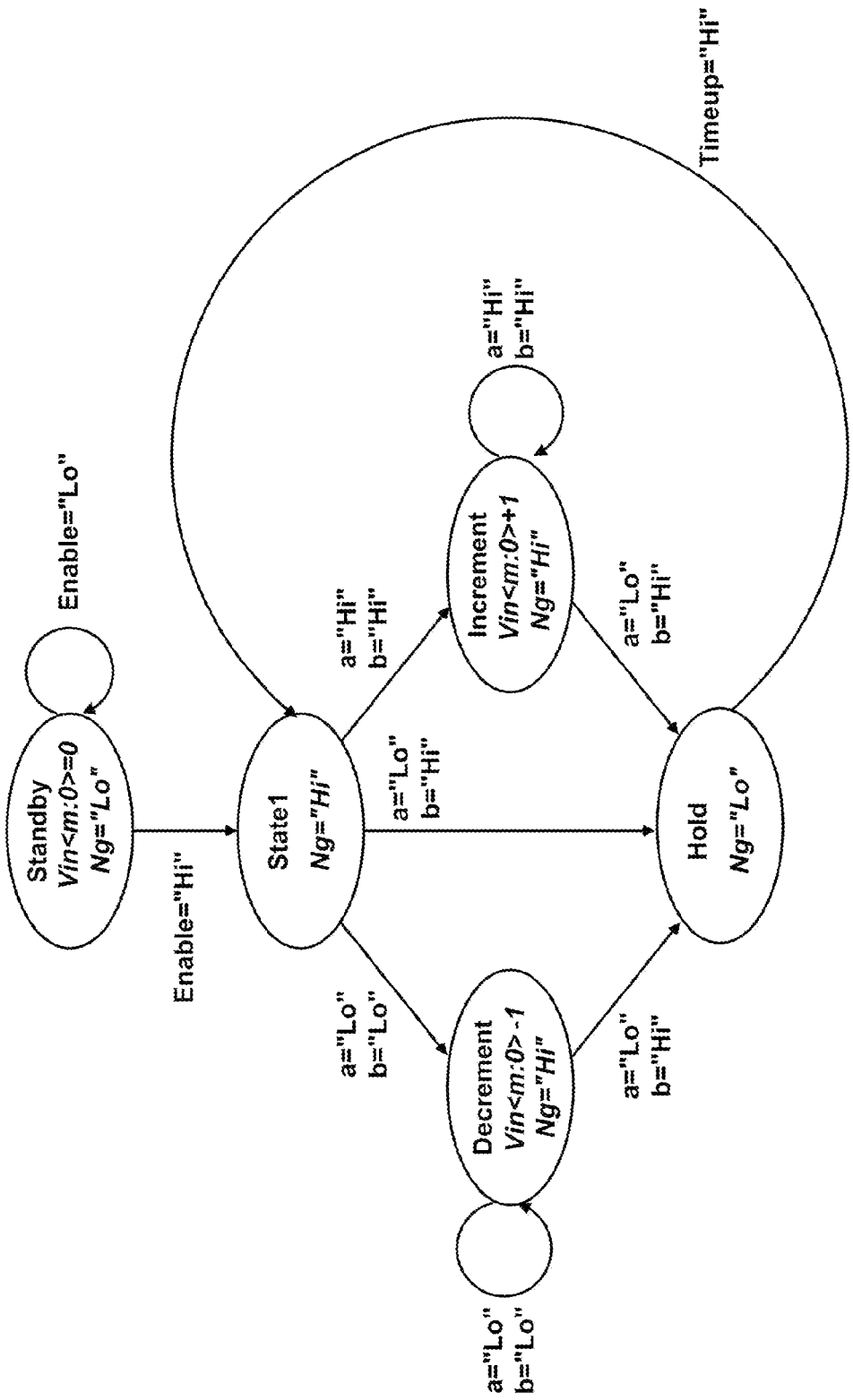
FIG. 5 is a state transition diagram illustrating the operation of the input voltage control circuit in the input voltage detection unit according to embodiments of the invention.

Following this, in FIG. 5, a state transition diagram is shown which illustrates the operation of the input voltage control circuit 13 in the input voltage detection unit 10 according to the invention.

First, when the level of an external control signal Enable is the Lo level, the state of the input voltage control circuit 13 becomes Standby state, in which the value of the input voltage digital signal Vin<m:0> is set to be the initial value 0 and the level of the gate signal Ng is set to the Lo level.

In the state of Standby, when the level of the external control signal Enable becomes the Hi level, the state of the input voltage control circuit 13 is shifted to the state of State 1, in which the level of the gate signal Ng becomes the Hi level to start the detection operation of the input voltage Vin, by which the divided voltage Vx is outputted with its voltage determined by the expression (1).

When the state of the input voltage control circuit 13 is State 1, the input voltage control circuit 13 detects the level of the comparison signals "a" and "b", and the state of the input voltage control circuit 13 is shifted to Decrement state, Hold state or Increment state depending on the level of the signals "a" and "b".

For example, in the state of State 1, when the level of the comparison signal "a" is the Lo level and the level of the comparison signal "b" is the Lo level (divided voltage Vx<reference voltage Vref1, and divided voltage Vx<reference voltage Vref2), the state of the input voltage control circuit 13 is shifted to Decrement state, in which the operation of decrementing the input voltage digital signal Vin<m:0> (Vin<m:0>−1) is repeated. Then, at the time the comparison signal "a" becomes the Lo level and the level of the comparison signal "b" becomes the Hi level (reference voltage Vref2<divided voltage Vx<reference voltage Vref1), the state is shifted to Hold state in which the input voltage digital signal Vin<m:0> is held.

In Hold state, the level of the gate signal Ng becomes the Lo level to stop the detection operation of the input voltage Vin, by which a current flowing between the input power supply terminal Vin and GND is shut off, which results in a low electric power consumption state.

Moreover, in the state of State 1, when the level of the comparison signal "a" is the Hi level and the level of the comparison signal "b" is the Hi level (reference voltage Vref1<divided voltage Vx, and reference voltage Vref2<divided voltage Vx), the state of the input voltage control circuit 13 is shifted to Increment state, in which the operation of incrementing the input voltage digital signal Vin<m:0> (Vin<m:0>+1) is repeated. Then, like in Decrement state, at the time the level of the comparison signal "a" becomes the Lo level and the level of the comparison signal "b" becomes the Hi level (reference voltage Vref2<divided voltage Vx<reference voltage Vref1), the state is shifted to Hold state in which the input voltage digital signal Vin<m:0> is held.

In addition, in the state of State 1, when the level of the comparison signal "a" is Lo level and the level of the comparison signal "b" is Hi level (reference voltage Vref2<divided voltage Vx<reference voltage Vref1), the state of the input voltage control circuit 13 is directly shifted to Hold state to keep the input voltage digital signal Vin<m:0> at that time.

When the level of the periodic signal Timeup from the timer circuit 14 becomes the Hi level, the state of the input voltage control circuit 13 is forced to shift to the state of State 1 again, by which the detection operation of the input voltage Vin is started again. This, while the switching power supply system is operating, enables the periodic detection of the input voltage Vin. For example, when the period of the periodic signal Timeup is made in coincidence with a switching period T, it becomes possible to detect the input voltage Vin in a pulse by pulse method.

Moreover, the use of the external control signal Enable in common with an enable signal or a reset signal of the switching power supply system enables the switching power supply system to carry out an initial detection operation of the input voltage Vin at the start and, during a steady state operation, to carry out detection operation for each period determined by the periodic signal Timeup.

Next to this, an operation of the input voltage detection unit 10 will be explained with a specific example. For example, in the case in which the external control signal (Lo active) of the switching power supply system and the external control signal Enable of the input voltage detection unit 10 are made common with the input voltage Vin=6V, the reference voltage Vref1=1.01V, the reference voltage Vref2=0.99V and the resistance of the resistor element R0 in the resistor array unit 17=r (Ω), the state of the input voltage control circuit 13 becomes Standby state while the level of the external control signal Enable is the Lo level to make the input voltage digital signal Vin<m:0> set at the initial value zero. Letting each of the switching circuits in the variable resistor circuit R2 be turned-on in a state in which the digital signal is 0 (Lo level) and be turned-off in a state in which the digital signal is 1 (Hi level), by the input voltage digital signal Vin<m:0> set at zero, all of the switching circuits are turned-on to provide the resistance of the variable resistor circuit R2 as zero (a).

Subsequent to this, with the level of the external control signal Enable brought to the Hi level, the state of the input voltage control circuit 13 is shifted to the state of State 1. At this time the resistance of the variable resistor circuit R2 is 0(Ω). Thus, the divided voltage Vx is given as Vx=the input voltage Vin=6V. That is, the relation among the divided voltage Vx and the reference voltages Vref1 and Vref2 is given as: the reference voltage Vref1<the divided voltage Vx and the reference voltage Vref2<the divided voltage Vx. Thus, the levels of both of the comparison signals "a" and "b" become the Hi levels, which makes the state of the input voltage control circuit 13 shift to Increment state to increment the input voltage digital signal Vin<m:0>.

With the input voltage digital signal Vin<m:0> made incremented, the resistance value of the variable resistor circuit R2 increases and the resistance value of the variable resistor circuit R1 decreases to decrease the divided voltage Vx. The input voltage control circuit 13 repeats the increment operation to shift to Hold state at the time in which the relation among the divided voltage Vx and the reference voltages Vref1 and Vref2 becomes as: the reference voltage Vref2=0.9V<the divided voltage Vx<the reference voltage Vref1=1.01V.

The digital signals for turning-on and -off their respective switch circuits in the variable resistor circuit R2 at this time become the input voltage digital signal Vin<m:0> corresponding to the input voltage Vin.

Moreover, the state of the input voltage detection unit 10, when the level of the periodically varying periodic signal Timeup becomes Hi level, the state of the input voltage control circuit 13 shifts to State 1 with the input voltage digital signal Vin<m:0> being held and carries out the same operations as above to repeat detection operation of the input voltage Vin.

Here, the resolution Vrs of the input voltage detection unit 10 according to the invention is determined by the maximum value of the input voltage Vin and the number of bits of the input voltage digital signal Vin<m:0>. For example, letting the maximum value Vin(max) of the input voltage Vin be 12V and the number of bits be 8 bit (m=8), the resolution Vrs becomes as is expressed by the expression (7):

$$Vrs = \frac{Vin(\max)}{2^m} = \frac{12}{256} = 46.9 \text{ mV} \tag{7}$$

Namely, when the input voltage digital signal Vin<m:0> varies by 1 LSB (Least Significant Bit), the width of variation of the divided voltage Vx, varying in stepwise, becomes 46.9 mV.

Further, the reference voltage Vref1 and the reference voltage Vref2 must be set so as to satisfy the following expression (8):

$$Vref1 - Vref2 > Vrs \tag{8}$$

Figure 6:
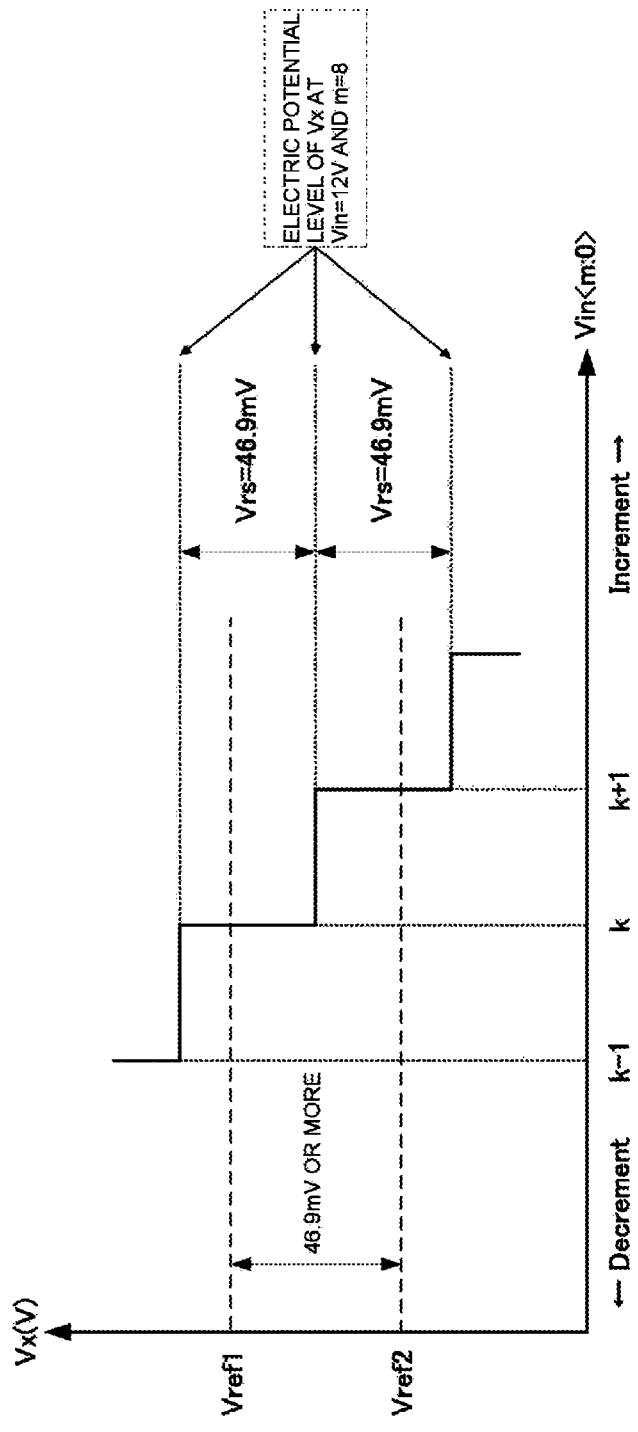
FIG. 6 is a diagram showing a relation between reference voltages and a resolution in the input voltage detection unit according to embodiments of the invention.

Namely, in the detection operation of the input voltage detection unit 10, an increment operation or a decrement operation of the resistance value of the resistor array unit 17 is carried out so that the relation among the divided voltage Vx and the reference voltages Vref1 and Vref2 becomes as: the reference voltage Vref2<the divided voltage Vx<the reference voltage Vref1. Thus, as shown in FIG. 6, a diagram showing a relation between reference voltages and a resolution in the input voltage detection unit according to the invention, the presence of at least one voltage value is necessary of voltage values which the divided voltages Vx, varying in stepwise, can take between the values of the reference voltage Vref1 and the reference voltage Vref2. For example, letting the maximum value Vin(max) of the input voltage Vin be 12V, the divided voltage Vx be 1V and the number of bits be 8 bits, the resolution Vrs becomes 46.9 mV from the expression (7).

Thus, for example, the reference voltage Vref1 and Vref2 can be set to 1.03V and 0.97V, respectively, to satisfy the expression (8).

Figure 7:
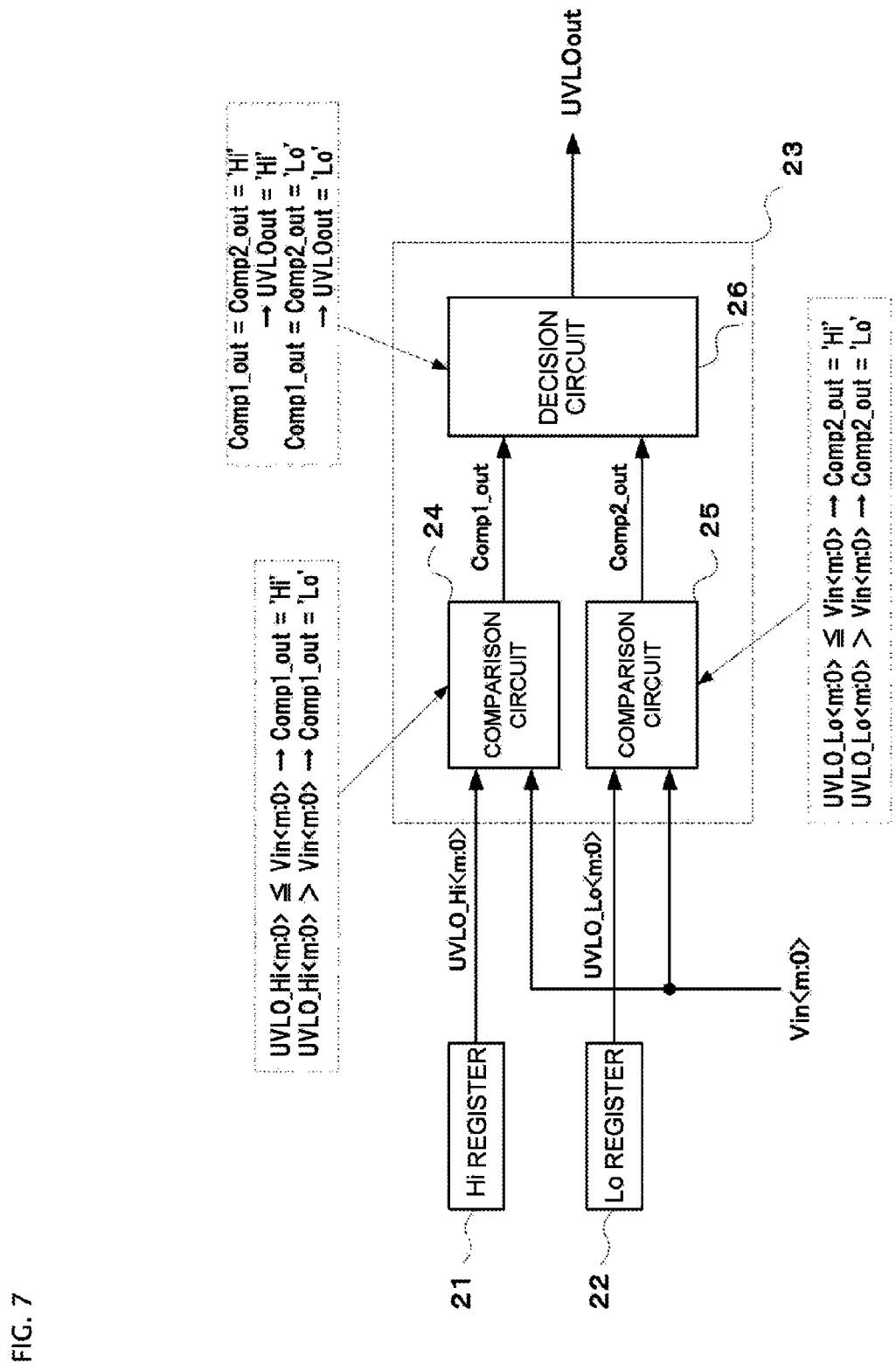
FIG. 7 is a block diagram showing an example of the circuit configuration of the voltage level comparison unit in the UVLO circuit according to embodiments of the invention.

Following this, a block diagram of an example of the circuit configuration of the voltage level comparison unit 20 in the UVLO circuit 1 according to the invention shown in FIG. 2 is shown in FIG. 7. The voltage level comparison unit 20 shown in FIG. 7 is provided with a Hi register 21 containing binary Hi register data UVLO_Hi<m:0> for setting a voltage detection level at an increase in the input voltage Vin, a Lo register 22 containing binary Lo register data UVLO_Lo<m:0> for setting a voltage detection level at a decrease in the input voltage Vin and a digital comparison circuit 23.

The digital comparison circuit 23 is provided with a comparison circuit 24, a comparison circuit 25 and a decision circuit 26. The comparison circuit 24 carries out a digital comparison made between an input voltage digital signal Vin<m:0> and Hi register data UVLO_Hi<m:0> to output the result of the comparison as an output signal Comp1_out. The comparison circuit 25 carries out a digital comparison made between an input voltage digital signal Vin<m:0> and Lo register data UVLO_Lo<m:0> to output the result of the comparison as an output signal Comp2_out. The decision circuit 26 makes a decision of the voltage level of an input voltage Vin on the basis of the output signals Comp1_out and Comp2_out as the results of the comparisons to output the result of the decision as an output signal UVLOout.

Here, the comparison circuit 24 outputs a Hi level signal as the output signal Comp1_out (hereinafter expressed as Comp1_out=Hi) when in the state of UVLO_Hi<m:0>≤Vin<m:0> and outputs a Lo level signal as the output signal Comp1_out (hereinafter expressed as Comp1_out=Lo) when in the state of UVLO_Lo<m:0>>Vin<m:0>. Similarly, the comparison circuit 25 outputs a Hi level signal as the output signal Comp2_out (hereinafter expressed as Comp2_out=Hi) when in the state of UVLO_Lo<m:0>≤Vin<m:0> and outputs a Lo level signal as the output signal Comp2_out (hereinafter expressed as Comp2_out=Lo) when in the state of UVLO_Lo<m:0>>Vin<m:0>. Moreover, the decision circuit 26 outputs an output signal UVLOout of Hi level (hereinafter expressed as UVLOout=Hi) when in the state of Comp1_out=Comp2_out=Hi and outputs the output signal UVLOout of Lo level (hereinafter expressed as UVLOout=Lo) when in the state of Comp1_out=Comp2_out=Lo.

Figure 8:
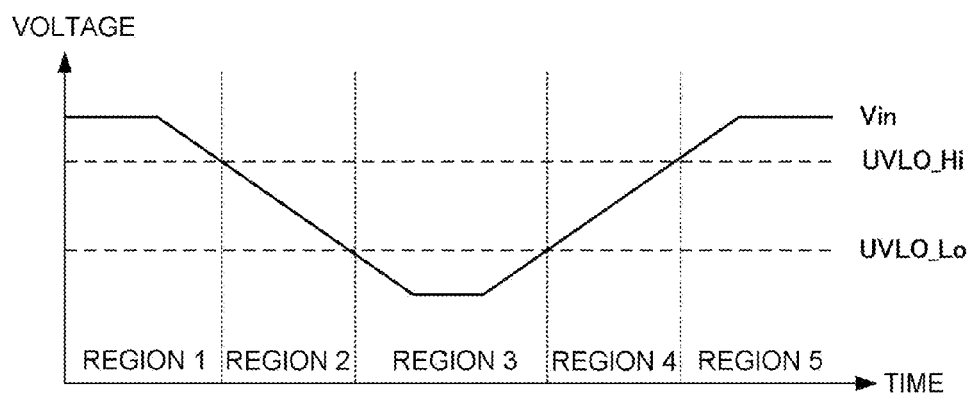
FIG. 8 is a timing chart for illustrating the operation of the voltage level comparison unit according to the invention shown in FIG. 7.

In FIG. 8, a timing chart is shown for illustrating the operation of the voltage level comparison unit 20 shown in FIG. 7. Although the voltage level comparison unit 20 carries out digital comparison operations by actually using binary digital data Vin<m:0>, UVLO_Hi<m:0> and UVLO_Lo<m:0>, with respect to FIG. 8 and in the following, the explanation will be made with the use of notations of voltage values Vin, UVLO_Hi and UVLO_Lo to which the above digital data Vin<m:0>, UVLO_Hi<m:0> and UVLO_Lo<m:0> are converted, respectively.

In a region in which an input voltage Vin is equal to or more than the output voltage UVLO_Hi of the Hi register 21 (region 1), the output signals COMP1_out and COMP2_out of their respective comparison circuits 24 and 25 become COMP1_out=COMP2_out=Hi, by which the output signal UVLOout of the decision circuit 26 becomes UVLOout=Hi. In a region 2 in which the input voltage Vin decreases by which a relation among the input voltage Vin, the output voltage UVLO_Hi of the Hi register 21 and the output voltage UVLO_Lo of the Lo register 22 becomes UVLO_Lo≤Vin<UVLO_Hi, the output signals COMP1_out and COMP2_out become COMP1_out=Lo and COMP2_out=Hi, respectively. This makes the decision circuit 26 keep the previous output. Thus, the output signal UVLOout becomes UVLOout=Hi. In a region 3 in which the input voltage Vin further decreases to become less than the output voltage UVLO_Lo to make the output signals COMP1_out and COMP2_out become COMP1_out=COMP2_out=Lo, the output signal UVLOout of the decision circuit 26 becomes UVLOout=Lo. Here, the input voltage Vin begins to increase and in a region 4 in which the relation among the input voltage Vin, the output voltage UVLO_Hi of the Hi register 21 and the output voltage UVLO_Lo of the Lo register 22 becomes UVLO_Lo≤Vin<UVLO_Hi, the output signals COMP1_out and COMP2_out become COMP1_out=Lo and COMP2_out=Hi, respectively. This makes the decision circuit 26 keep the previous output. Thus, the output signal UVLOout becomes UVLOout=Lo. In a region 5 in which the input voltage Vin further increases to be equal to or more than the output voltage UVLO_Hi of the Hi register 21 to make the output signals COMP1_out and COMP2_out become COMP1_out=COMP2_out=Hi, the output signal UVLOout of the decision circuit 26 becomes UVLOout=Hi.

In addition, the voltage difference between the output voltages UVLO_Hi and UVLO_Lo becomes the hysteresis width of the digital comparison circuit 23. Namely, by arbitrarily setting data of mbits stored in the Hi register 21 and the Lo register 22, a desired hysteresis characteristic can be actualized.

As was explained in the foregoing, the voltage level comparison unit 20 in the UVLO circuit 1 shown in FIG. 2, by carrying out comparison of the input voltage digital signal Vin<m:0> with the Hi register data UVLO_Hi<m:0> stored in the Hi register 21 and the Lo register data UVLO_Lo<m:0> stored in the Lo register 22, makes a decision of the voltage level of the input voltage Vin to produce and output an output signal UVLOout.

Figure 9:
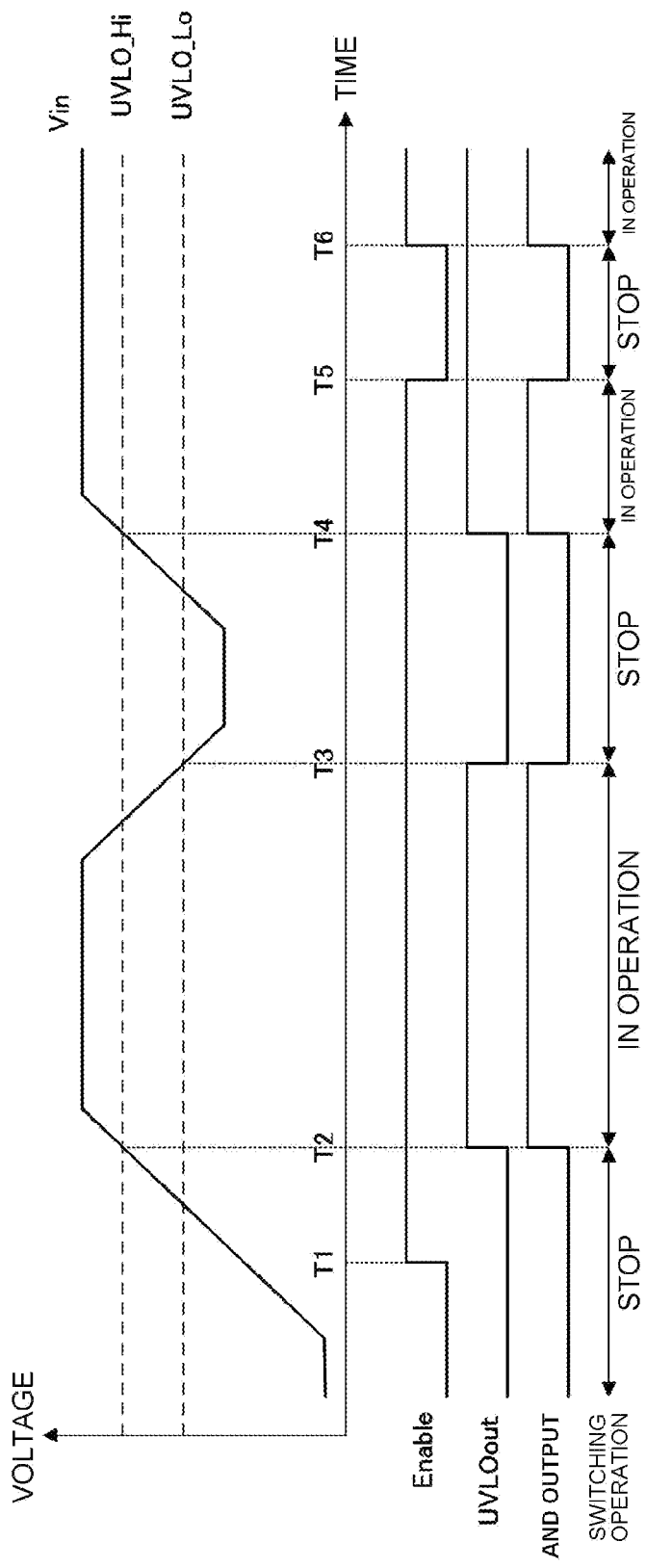
FIG. 9 is a timing chart of the switching power supply system provided with the UVLO circuit according to the invention shown in FIG. 1.

Subsequent to this, FIG. 9 is a timing chart of the switching power supply system provided with the UVLO circuit 1 according to the invention shown in FIG. 1. Like in FIG. 8, digital data will be explained in notations of voltage values to which the digital data are converted.

First, after an input voltage Vin begins to increase, the level of an external control signal Enable is changed from Lo level to Hi level (T1). However, the input voltage Vin is still in a state of Vin<UVLO_Hi, which therefore causes the level of the output signal UVLOout of the UVLO circuit 1 to be still Lo level. Thus, the level of the output of the AND circuit 2 also becomes Lo level, by which the control circuit 3 is in an operation inhibiting state to stop a switching operation. When the input voltage Vin increases to be brought into a state of Vin>UVLO_Hi (T2), the output signal UVLOout becomes UVLOout=Hi, which also makes the level of the output of the AND circuit 2 Hi level. Thus, the control circuit 3 is in an operation permission state to start a switching operation. Subsequent to this, with the input voltage Vin made to begin to decrease to be in a state of Vin<UVLO_Lo (T3), the output signal UVLOout becomes UVLOout=Lo to also bring the level of the output of the AND circuit 2 to Lo level. Thus, the control circuit 3 is in an operation inhibiting state to stop the switching operation. When the input voltage Vin increases again to become the state of Vin>UVLO_Hi (T4), the output UVLOout signal becomes ULVOout=Hi, which also makes the level of the output of the AND circuit 2 Hi level. Thus, the control circuit 3 is in the operation permission state again to start a switching operation. At the timing T5, with the level of the external control signal Enable changed to Lo level, the level of the output of the AND circuit 2 becomes Lo level. Thus, the control circuit 3 is in the operation inhibiting state to also stop the switching operation. At the timing T6, with the level of the external control signal Enable changed to Hi level again, the level of the output of the AND circuit 2 becomes Hi level. Thus, the control circuit 3 is again in the operation permission state to start a switching operation.

As was explained in the foregoing, in the switching power supply system provided with a UVLO circuit according to the invention, a UVLO circuit is actualized in which an input voltage Vin is converted to an input voltage digital signal Vin<m:0> by the input voltage detection unit 10, then the converted input voltage digital signal Vin<m:0> is subjected to digital comparisons with the Hi resister data of the Hi register 21 and the Lo register data of the Lo register 22 for a decision made on the voltage level of the input voltage Vin on the basis of the results of the comparisons, and the result of the decision is outputted as the UVLOout signal. This enables actualization of a switching power supply system in which a threshold voltage and a hysteresis characteristic of a UVLO circuit can be precisely and easily set to desired data and a malfunction at a low voltage operation is prevented. Moreover, with a configuration that shuts off the current path in the resistor array unit 17 except the time of detecting operation of the input voltage Vin, the actualization of low power consumption is possible.

In the foregoing, an embodiment of the invention has been explained. The invention, however, is not limited to the above explained embodiment but various improvements and modifications are possible within a range without departing from the spirit and scope of the present invention.

This application is based on, and claims priority to, Japanese Patent Application No. 2010-112831, filed on May 17, 2010, and Japanese Patent Application No. 2010-255763, filed on Nov. 16, 2010. The disclosures of the priority applications, in their entirety, including the drawings, claims, and the specifications thereof, are incorporated herein by reference.

What is claimed is:

1. A switching power supply system controlling switching operations of switching devices by a control circuit to convert an input voltage into a desired output voltage, the system being provided with an under voltage lock out circuit comprising:
an input voltage detection unit detecting the input voltage and producing an input voltage digital signal representing the magnitude of the input voltage; and
a voltage level comparison unit carrying out digital comparison of the input voltage digital signal with each of first and second voltage detection level data and outputting the results of the comparisons,
wherein, when the magnitude of the input voltage represented by the input voltage digital signal is smaller than the magnitude of the voltage represented by each of the first and second voltage detection level data, the switching operations being inhibited, and
wherein, when the magnitude of the input voltage represented by the input voltage digital signal is larger than the magnitude of the voltage represented by each of the first and second voltage detection level data, the switching operations being permitted.

2. The switching power supply system as claimed in claim 1 wherein the input voltage detection unit comprises:
a resistor array unit having a variable resistor circuit and a resistor element provided between the input voltage and the ground voltage and outputting a divided voltage of the input voltage;
a reference voltage supply outputting a first and second reference voltages;
a first comparison circuit comparing the divided voltage of the input voltage with the first reference voltage to output a first comparison signal;
a second comparison circuit comparing the divided voltage of the input voltage with the second reference voltage to output a second comparison signal; and
an input voltage control circuit carrying out control of the voltage dividing ratio for the divided voltage of the input voltage on the basis of the first and second comparison signals so that the divided voltage of the input voltage is kept between the first and second reference voltages to produce the input voltage digital signal on the basis of the dividing ratio at that time.

3. The switching power supply system as claimed in claim 1 wherein the voltage level comparison unit comprises:
a first register circuit storing the first voltage detection level data;
a second register circuit storing the second voltage detection level data; and
a digital comparison circuit comprising:
a first comparator carrying out digital comparison of the input voltage digital signal with the first voltage detection level data;
a second comparator carrying out digital comparison of the input voltage digital signal with the second voltage detection level data; and
a decision circuit carrying out a decision of the voltage level of the input voltage on the basis of the levels of the outputs of the first and second comparators to produce one of a permission signal and an inhibition signal of the switching operation.

4. The switching power supply system as claimed in claim 2 wherein the input voltage detection unit further comprises a timer circuit and, with a detection period set in the timer circuit, the input voltage detection unit carries out a detection operation of an input voltage.

5. The switching power supply system as claimed in claim 2 wherein:
the resistor array unit has a series circuit of a first variable resistor circuit, a second variable resistor circuit and a resistor element, each of the first and second variable resistor circuits being formed of a plurality of parallel circuits connected in series, each with a resistor element having a weighted resistance value and a switching circuit connected in parallel to the resistor element; and
the input voltage control circuit controls the turned-on and turned-off states of the switching circuits on the basis of the first and second comparison signals to adjust the voltage dividing ratio for the divided voltage of the input voltage, and determines the input voltage digital signal on the basis of the turned-on and turned-off states of the switching circuits when the divided voltage of the input voltage comes between the first and second reference voltages.

6. The switching power supply system as claimed in claim 5 wherein a switching circuit in the first variable resistor circuit and a switching circuit, corresponding to the switching circuit in the first variable resistor circuit, in the second variable resistor circuit have their respective turned-on and turned-off states complementarily controlled by the input voltage digital signal.

7. The switching power supply system as claimed in claim 2 wherein the resistor array unit has a switching device connected in series thereto, the switching device has its turning-on and -off controlled by the output signal of the input voltage control circuit, and when the detection operation of the input voltage is terminated, the switching device is made turned-off by the output signal to shut off the current flowing in the input voltage control circuit.

* * * * *